United States Patent [19]
Rogers et al.

[11] Patent Number: 6,144,335
[45] Date of Patent: Nov. 7, 2000

[54] AUTOMATED DIFFERENTIAL CORRECTION PROCESSING OF FIELD DATA IN A GLOBAL POSITIONAL SYSTEM

[75] Inventors: John F. Rogers, Sunnyvale, Calif.; Peter Glen France, Christchurch, New Zealand

[73] Assignee: Trimble Navigation Limited, Sunnyvale, Calif.

[21] Appl. No.: 09/060,363

[22] Filed: Apr. 14, 1998

[51] Int. Cl.⁷ .............................. H04B 7/185; G01S 5/02
[52] U.S. Cl. ...................................... 342/357.03; 701/215
[58] Field of Search ........................ 342/357.03, 357.02; 701/215, 214

[56] References Cited

U.S. PATENT DOCUMENTS

| | | | |
|---|---|---|---|
| 5,477,458 | 12/1995 | Loomis | 342/363 |
| 5,577,122 | 11/1996 | Schipper et al. | 342/358 |
| 5,899,957 | 5/1999 | Loomis | 701/215 |

*Primary Examiner*—Theodore M. Blum
*Attorney, Agent, or Firm*—Wagner, Murabito & Hao LLP

[57] ABSTRACT

A system and method for automated differential correction processing of field data in a global positioning system (GPS). In one embodiment, the present invention retrieves GPS field data collected by one or more GPS receivers from a storage device, and then automatically selects the most appropriate differential correction scheme to generate a solution without user intervention. More specifically, the present invention executes a code-based correction scheme to generate a code-based solution for the field data. Next, the present invention examines the field data to determine whether a carrier phase correction is applicable. If the field data supports carrier phase correction, the present invention generates a carrier phase solution, compares it with the code-based solution, and returns the more accurate of the two solutions as the final result. If the field data does not support a carrier phase correction, the present invention returns the code-based solution as the final result. Thus, the present invention provides a system and method for post-processing of GPS field data which does not require a user to know and understand the contents of the field data, to deal with multiple user interfaces, or to read and interpret different results generated by various processing schemes. In other words, the present invention provides a single software package for post-processing of GPS field data without extensive user involvement. As such, the present invention greatly reduces the complexity of GPS field data post-processing and enhances the usability of GPS equipment.

36 Claims, 6 Drawing Sheets

AUTOMATED DIFFERENTIAL CORRECTION PROCESSING OF FIELD DATA IN A GLOBAL POSITIONAL SYSTEM

TECHNICAL FIELD

This invention pertains to the Global Positioning System (GPS). Specifically, the present invention pertains to the post-collection processing of GPS field data.

BACKGROUND ART

The GPS is a space-based radio positioning network for providing users, equipped with suitable receivers, highly accurate positional information. Developed by the United States Department of Defense (DOD), the space-based portion of the GPS comprises a constellation of GPS satellites in non-geosynchronous orbits around the earth. By measuring the distances between a GPS receiver and the GPS satellites, the position of the GPS receiver may be accurately determined. The process of determining a position using a single GPS receiver is generally known as absolute positioning or autonomous positioning. Under ordinary circumstances, autonomous positioning can generate results having an accuracy of approximately 100 meters in a horizontal plane when selective availability (a signal degradation deliberately introduced by the DOD) is turned on, and approximately 10 to 30 meters in the horizontal direction when selective availability is turned off.

Autonomous positioning, however, is typically not accurate enough to be used for surveying and mapping purposes. Rather, a method called differential positioning, or differential GPS positioning (DGPS), has been applied in the fields of surveying and cartography to generate more accurate positional information. In one form of DGPS, two GPS receivers are used. One GPS receiver is placed over a point such as a National Geodetic Survey (NGS) survey monument whose position is precisely known. This GPS receiver is usually referred to as the base receiver. The second GPS receiver, generally referred to as the "rover," collects data from unknown points. GPS data collected by the base receiver and by the rover are then processed to generate a relative position of the rover to the base receiver. Because the exact location of the base receiver is already known, the position of the rover can then be calculated with precision and accuracy.

Typically, after a set of GPS field data has been collected at a survey site, it is downloaded to a computer for post-collection processing. Several types of differential correction schemes are currently available. Prior Art FIG. 1 is a hierarchical diagram 100 showing the various types of differential correction schemes. Specifically, DGPS correction schemes can be classified into two categories: a code-based correction scheme 140 and a carrier phase correction scheme 150. Carrier phase correction scheme 150 can be further classified into fixed integer correction 160 with centimeter-level accuracy, and floating point correction 170 with decimeter-level accuracy. Depending on the level of accuracy desired for a particular application, a user can configure a GPS receiver and data collector computer to collect GPS field data that is appropriate for the respective correction scheme so that the GPS field data can then be processed accordingly in an attempt to derive a solution (corrected position) of the desired accuracy.

After a set of GPS field data has been collected at a survey site, post-processing is typically performed using an office-based computer. Each of the three DGPS correction schemes described above has a corresponding software processing engine for processing the GPS field data to generate a solution of the respective accuracy. Because a particular correction scheme cannot produce a solution of the desired accuracy unless the collected field data contains sufficient information, a user must know and understand the contents of the GPS field data in order to select a proper processing engine for use with that particular set of data. This can be a significant inconvenience to the user responsible for the post-processing of GPS field data. For instance, the user may not be the same person who collected the field data and thus may not know about the conditions under which the data is collected. Even if the same user is responsible for both collecting and post-processing of the data, the user may not have a detailed understanding of the collected data to identify and apply the proper processing engine to the particular set of data.

Furthermore, while GPS field data collected specifically for DGPS purposes can always be processed by code-based correction to obtain a solution of meter-level accuracy, such GPS field data may or may not contain sufficient information to be processed by carrier phase correction to obtain a meaningful solution, depending on the conditions in effect during data collection. For instance, certain types of field data receivers have limited data collection capability and may not be able to collect adequate information for carrier phase correction. Another important factor is the duration of satellite lock. If the period of continuous tracking of relevant data from one or more GPS satellites is not long enough, the field data collected may not be sufficient for carrier phase correction. Moreover, the base line length, or the proximity of the field data receiver to a base station, may also affect whether the field data collected can be processed by carrier phase correction. These and other factors will determine whether a carrier phase solution can be derived from the GPS field data collected. In other words, non-ideal conditions during the data collection session may preclude a user from obtaining a solution of the desired accuracy.

In addition, even if a user understands the contents of a set of field data, the user may not be able to determine whether a particular correction scheme would yield a meaningful solution. Often, a user has to process the available data with the fixed-integer correction processing engine and then examine the solution and also the quality of the solution, as reflected by various statistical accuracy indicators, to decide whether the fixed integer solution is acceptable. If this attempt with the fixed integer correction scheme fails, the user needs to process the data all over again with the floating point correction processing engine. Furthermore, the floating point correction processing engine usually has a user interface which is different from that of the fixed integer correction processing engine. The user must then examine the floating point solution and its quality. If the floating point solution is still unsatisfactory, the user must resort to the code-based correction processing engine and repeat the correction processing step to get a code-based solution. During this manual post-processing procedure, the user frequently has to run multiple correction processing engines and deal with their different user interfaces, wasting much time in the effort.

Moreover, a user must be able to read and interpret different solutions and their quality (based on their respective accuracy indicators) generated by the various processing engines in order to determine whether a particular solution is acceptable or not. This means a user must possess detailed knowledge of the GPS and computer data processing fields to perform the post-processing task. Additionally, this trial and error approach not only discourages many novice users but also frustrates sophisticated users, and is a great disincentive for potential users to purchase and use GPS equipment.

Thus, a need exists for a system and method for post-processing of GPS field data which does not require a user to know and understand the contents of the GPS field data. A further need exists for a system and method for post-processing of GPS field data which does not require a user to manually and sequentially invoke a series of different processing schemes in order to obtain a DGPS solution of acceptable accuracy from the GPS field data. Yet another need exists for a system and method for post-processing of GPS field data which does not require a user to deal with multiple user interfaces and different processing requirements. Still another need exists for a system and method for post-processing of GPS field data which does not require a user to read and interpret different solutions generated by various processing schemes. Additionally, a need exists for a system and method for post-processing of GPS field data which does not require a user to possess detailed knowledge of the GPS and computer data processing fields in order to obtain a DGPS solution of acceptable accuracy from the GPS field data.

DISCLOSURE OF THE INVENTION

Accordingly, the present invention provides a system and method for post-processing of GPS field data which does not require a user to know and understand the contents of the GPS field data. The present invention further provides a system and method for post-processing of GPS field data which does not require manual and sequential execution of a series of different processing schemes by a user. The present invention also provides a system and method for post-processing of GPS field data which does not burden a user with multiple user interfaces and different processing requirements, and does not require a user to read and interpret different solutions generated by various processing schemes. Moreover, the present invention provides a system and method for post-processing of GPS field data which does not require detailed knowledge of the GPS and computer data processing fields on the part of the user. The above benefits have been achieved with the novel, automated post-processing of GPS field data using an integrated software package with a single user interface to generate a DGPS solution from the field data, as is disclosed in the instant application.

More specifically, according to one embodiment of the present invention, GPS field data collected by one or more GPS receivers is retrieved from a storage device. Then, the most appropriate differential correction scheme is automatically selected to generate a DGPS solution without user intervention. A code-based correction scheme is then executed to generate a code-based solution for the field data. Next, the field data is examined to determine whether a carrier phase correction is applicable. If the field data contains sufficient information to support carrier phase correction, a carrier phase solution is generated and its quality is compared with that of the code-based solution. The more accurate of the two positions is returned as the final result. On the other hand, if the field data does not contain sufficient information to support a carrier phase correction, the code-based solution is returned as the final result without having to invoke a carrier phase correction.

In another embodiment of the present invention, a carrier phase solution is derived by first executing a fixed integer correction scheme. If fixed integer correction is successful, the fixed integer solution is returned as the representative carrier phase solution; otherwise, a floating point correction scheme is executed to generate a floating point solution to be returned as the representative carrier phase solution. Using accuracy indicators of the respective solutions, the quality of the representative carrier phase solution (fixed integer solution or floating point solution) is then compared to the quality of the code-based solution, and the more accurate solution is returned to the user as the final result.

Thus, the present invention reduces the complexity of GPS field data post-processing by providing a single software package which automates the entire post-processing task without extensive user involvement. Using the present invention, a user no longer has to manually execute a series of post-processing schemes. Instead, a user only needs to interact with one user interface to initiate the post-processing and all appropriate post-processing schemes are executed automatically. Consequently, the usability of GPS post-processing equipment is greatly enhanced. In addition, even an untrained user may use the present invention to process GPS field data as the present invention does not require a user to interpret the results generated by various post-processing schemes.

Other advantages of the present invention will no doubt become apparent to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Figure 1:
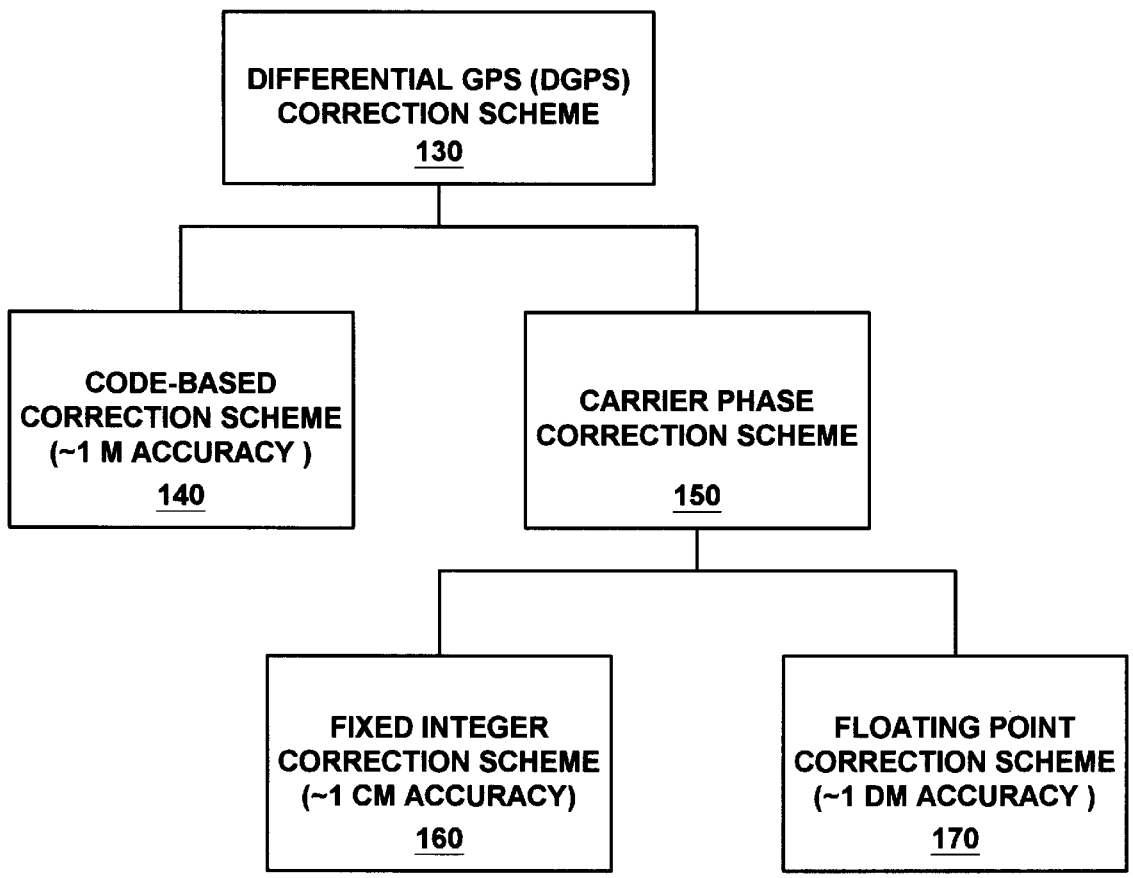
FIG. 1 is a hierarchical diagram showing various types of differential correction schemes.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "retrieving", "executing", "determining", "analyzing", "identifying" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF ONE EMBODIMENT OF THE GPS FIELD DATA POST-PROCESSING SYSTEM OF THE PRESENT INVENTION

Figure 2:
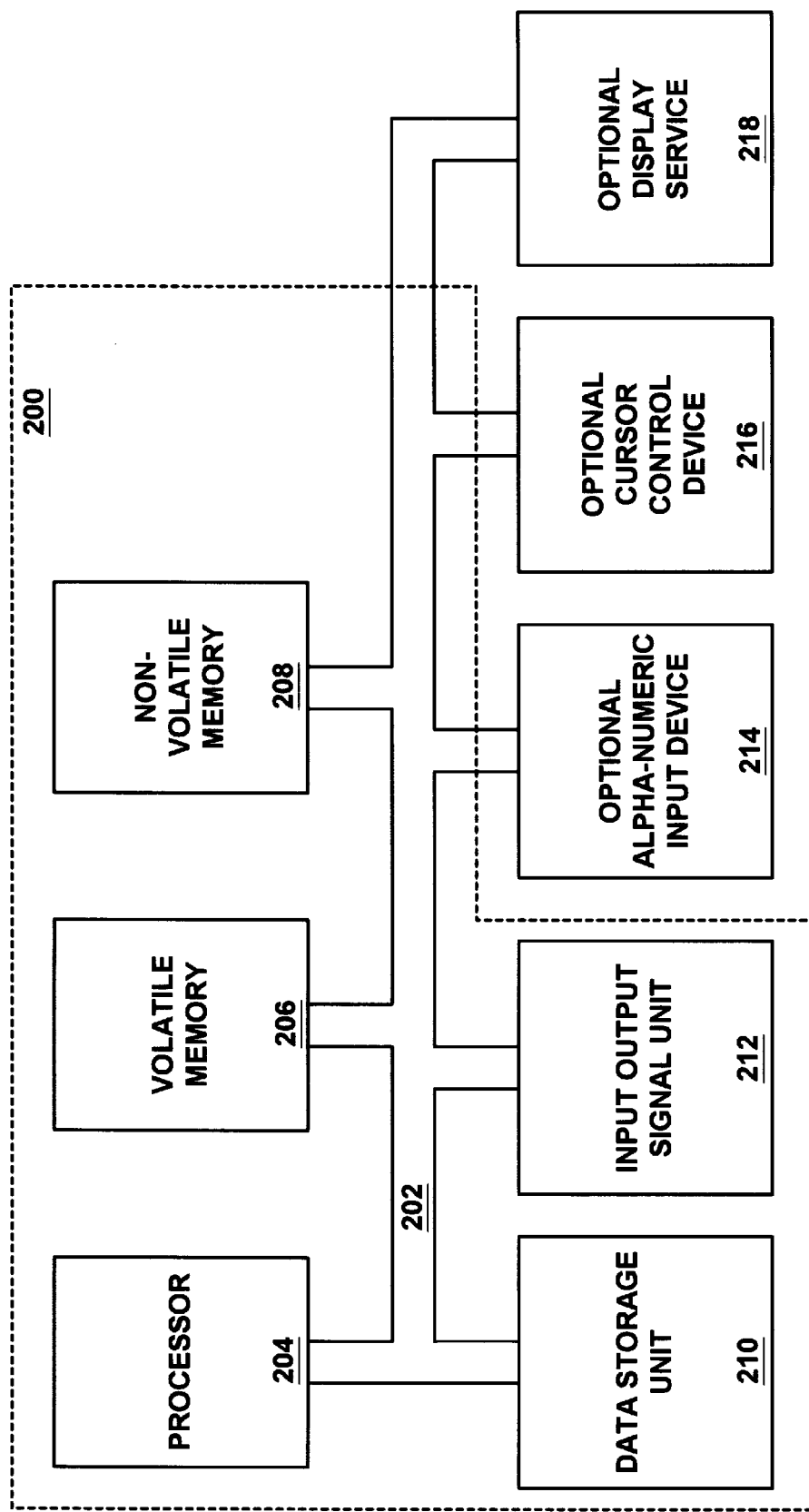
FIG. 2 is a schematic illustration of an exemplary computer system used as a part of a GPS field data post-processing system in accordance with one embodiment of the present invention.

With reference now to FIG. 2, portions of the present GPS field data post-processing system are comprised of computer-readable and computer-executable instructions which reside, for example, in computer-usable media of a computer system. FIG. 2 illustrates an exemplary computer system 200 used as a part of a GPS field data post-processing system in accordance with one embodiment of the present invention. It is appreciated that system 200 of FIG. 2 is exemplary only and that the present invention can operate within a number of different computer systems including general purpose computer systems, embedded computer systems, and stand alone computer systems specially adapted for GPS field data post-processing systems.

System 200 of FIG. 2 includes an address/data bus 202 for communicating information, and a central processor unit 204 coupled to bus 202 for processing information and instructions. System 200 also includes data storage features such as a computer usable volatile memory 206, e.g. random access memory.(RAM), coupled to bus 202 for storing information and instructions for central processor unit 204, computer usable non-volatile memory 208, e.g. read only memory (ROM), coupled to bus 202 for storing static information and instructions for the central processor unit 204, and a data storage device 210 (e.g., a magnetic or optical disk and disk drive) coupled to bus 202 for storing information and instructions. A signal input output communication device 212 (e.g. a modem) coupled to bus 202 is also included in system 200 of FIG. 2. System 200 of the present GPS field data post-processing system also includes an optional alphanumeric input device 214 including alphanumeric and function keys is coupled to bus 202 for communicating information and command selections to central processor unit 204. System 200 may also includes an optional cursor control device 216 coupled to bus 202 for communicating user input information and command selections to central processor unit 204. System 200 of the present embodiment may also include an optional display device 218 coupled to bus 202 for displaying information.

Display device 218 of FIG. 2, utilized with the present GPS field data post-processing system, may be a liquid crystal device, cathode ray tube, or other display device suitable for creating graphic images and alphanumeric characters recognizable to a user. Optional cursor control device 216 allows the computer user to dynamically signal the two dimensional movement of a visible symbol (cursor) on a display screen of display device 218. Many implementations of cursor control device 216 are known in the art including a trackball, mouse, touch pad, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. The present invention is also well suited to directing a cursor by other means such as, for example, voice commands. A more detailed discussion of the present GPS field data post-processing system is found below.

GENERAL DESCRIPTION OF ONE EMBODIMENT OF THE GPS FIELD DATA POST-PROCESSING SYSTEM OF THE PRESENT INVENTION

Figure 3:
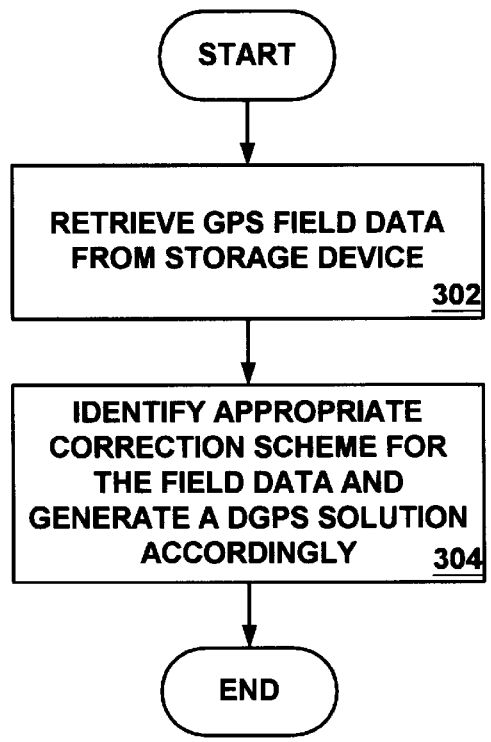
FIG. 3 is a flow diagram illustrating a process used by the present GPS field data post-processing system to generate a DGPS solution in accordance with one embodiment of the present invention.

With reference next to FIG. 3, a flow diagram 300 illustrating the process used by the GPS field data post-processing system in accordance with one embodiment of the present invention is shown. Flow diagram 300 includes processes of the present GPS field data post-processing system which, in one embodiment, are carried out by a processor under the control of computer-readable and computer-executable instructions. The computer-readable and computer-executable instructions reside, for example, in data storage features such as computer usable volatile memory 206 and/or computer usable non-volatile memory 208 of FIG. 2. The computer-readable and computer-executable instructions are used to control, for example, the operation and functioning of central processing unit 204 of FIG. 2.

With reference again to FIG. 3, in step 302, the present GPS field data post-processing system retrieves raw GPS field data from a storage device. Typically, raw GPS field data has been collected by one or more GPS receivers and a data collector computer during a field data collection session.

Then, in step 304, the present GPS field data post-processing system automatically selects the most appropriate DGPS correction scheme based on the information available in the raw GPS field data and generates a DGPS solution by post-processing the raw GPS field data with the selected correction scheme.

Importantly, once a user initiates the post-processing, the selection of the appropriate correction scheme and the generation of the solution are all automated and do not require any further user involvement. As such, a user does not need to be aware of the contents of the raw GPS field data or deal with multiple correction schemes. Instead, a final result is automatically presented to the user at the end of post-processing by the present GPS field data post-processing system without any interpretative effort on the part of the user. Furthermore, no sophisticated knowledge regarding GPS or computer data processing is required of the user.

Thus, the present GPS field data post-processing system greatly simplifies GPS post-processing and relieves a user from performing time-consuming manual steps.

It is appreciated that the raw GPS field data may include multiple sets of position determination data collected at more than one location. Under such circumstances, the present GPS field data post-processing system may generate a DGPS solution for each set of position determination data in an iterative manner, such that the most appropriate correction scheme to each set of position determination data is applied.

Figure 4:
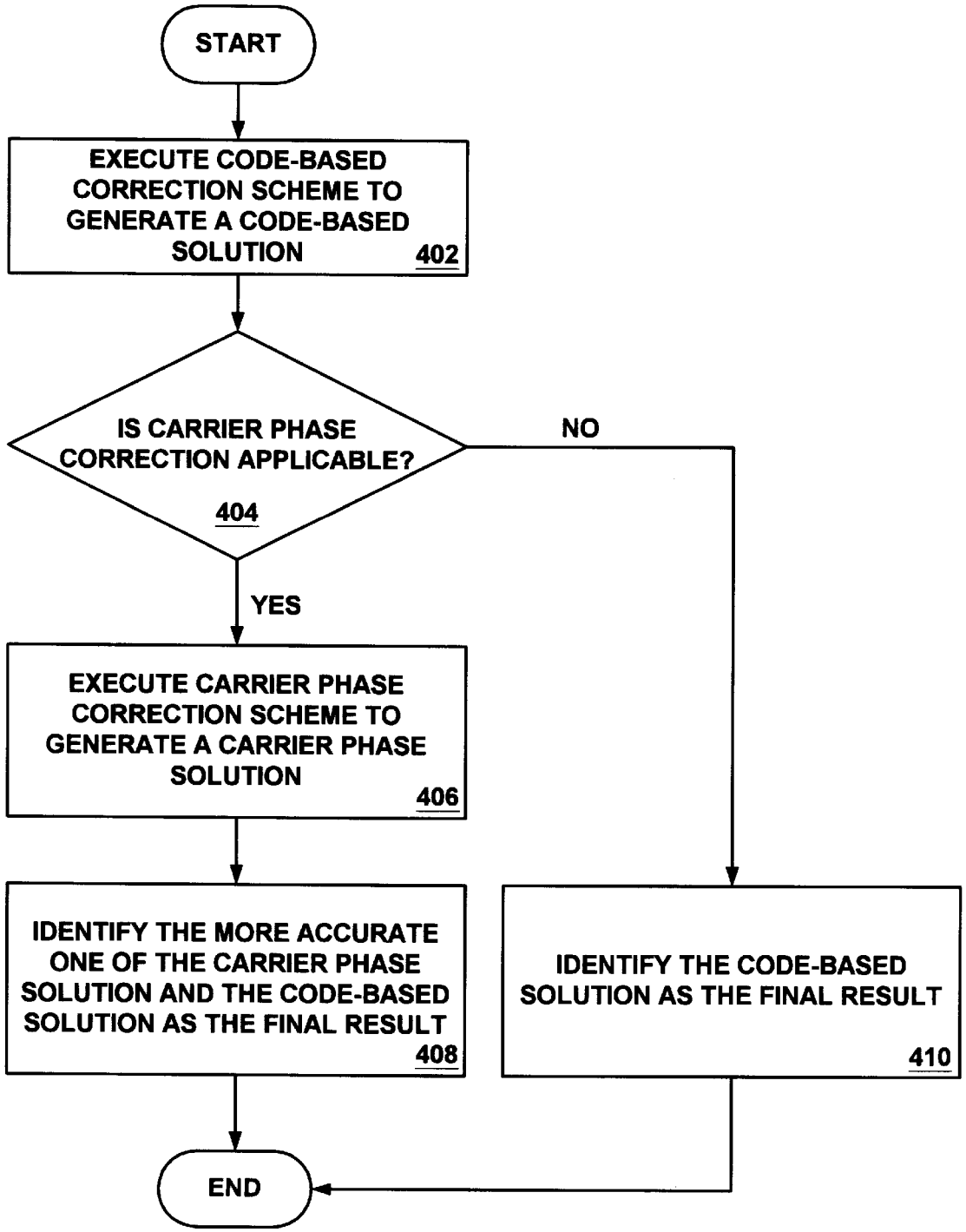
FIG. 4 is a flow diagram illustrating a process used by the present GPS field data post-processing system to select an appropriate correction scheme in accordance with another embodiment of the present invention.

Referring next to FIG. 4, in one embodiment, the present GPS field data post-processing system selectively identifies a carrier phase solution as the final result when carrier phase correction is applicable to the GPS field data being processed. FIG. 4 illustrates the process of selecting an appropriate correction scheme according to one embodiment of the present invention. Because code-based correction is always achievable given a set of raw GPS field data collected specifically for DGPS purposes, in step 402, the present GPS field data post-processing system executes a code-based correction scheme to generate a code-based solution.

Next, in step 404, the system examines the raw GPS field data to determine whether carrier phase correction is applicable. When the system determines that carrier phase correction is applicable, the system proceeds to step 406.

At step 406, the present embodiment of the invention executes a carrier phase correction scheme to generate a carrier phase solution.

Then, in step 408, the system examines the carrier phase solution generated in step 406 and the code-based solution generated in step 402 and identifies the more accurate one of the two solutions as the final result.

On the other hand, still referring to FIG. 4, if the system determines in step 404 that carrier phase correction is inapplicable to the given set of raw data, the system proceeds to step 410. In step 410, the present embodiment promptly identifies the code-based solution generated in step 402 as the final result. Thus, the present invention effectively avoids extraneous processing by pre-examining the raw data to determine the applicability of carrier phase correction and by bypassing the execution of the scheme when it is not applicable.

Figure 5:
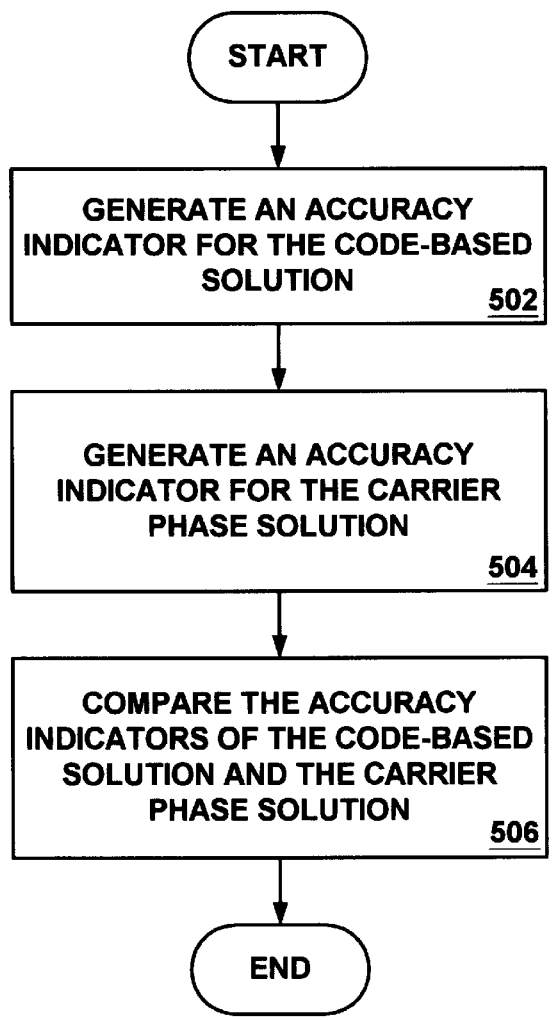
FIG. 5 is a flow diagram illustrating a process used by the present GPS field data post-processing system to identify a more accurate one of two DGPS solutions in accordance with one embodiment of the present invention.

Referring next to FIG. 5, a flow diagram 500 illustrating the process of selecting one of the code-based solution and the carrier phase solution as the final result according to one embodiment of the present invention is shown. In step 502, the present embodiment generates an accuracy indicator for the code-based solution in conjunction with code-based correction. More specifically, an accuracy indicator comprises metadata generated in conjunction with a code-based or carrier phase solution and defines the statistical error of the solution. In one embodiment of the present invention, each of the accuracy indicators as described in flow chart 500 comprises three sigma, or standard deviation, terms (e.g., in the eastward, northward, and upward directions) and a covariance term (e.g., between the eastward and northward directions). These four terms define the horizontal error ellipse and the vertical error of the corresponding solution and are used for quality assurance and quality control purposes (QA/QC data) in selecting the final result. In particular, in another embodiment, the horizontal precision (computed as the square root of the sum of squared sigma values in the north and the east) is used as a selection criterion for the final result. It is appreciated that while the instant embodiments utilize the above described statistical values, alone or in combination, as selection criteria for identifying the final result, it will be apparent to one skilled in the art, upon reading the present disclosure, that other statistical values or indicators of error can be used for the same purpose.

In step 504, the present embodiment similarly generates an accuracy indicator for the carrier phase solution in conjunction with carrier phase correction.

Then, in step 506, the present embodiment utilizes the accuracy indicators generated in steps 502 and 504 as a selection criterion for identifying the final result to represent the true position as recorded in the raw GPS field data.

Figure 6:
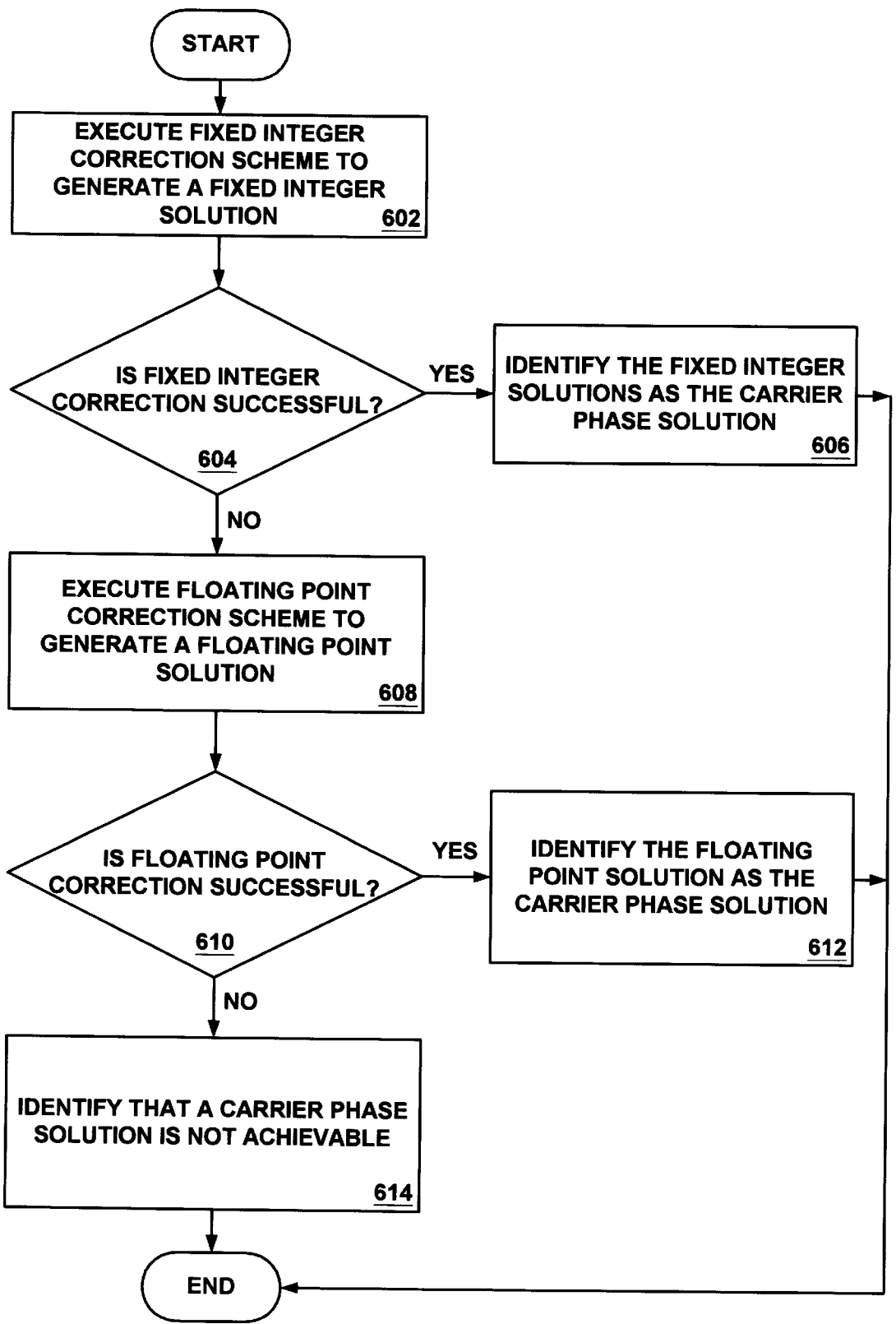
FIG. 6 is a flow diagram illustrating a process used by the present GPS field data post-processing system to attempt to derive a carrier phase DGPS solution in accordance with one embodiment of the present invention.

In one embodiment, the present GPS field data post-processing system further refines the steps of carrier phase correction when carrier phase correction is applicable to the GPS field data being processed. FIG. 6 is a flow diagram 600 illustrating the process of attempting to derive a carrier phase solution according to one embodiment of the present invention. Because fixed integer correction requires more information in the raw data than does floating point correction, in step 602, the present GPS field data post-processing system executes a fixed integer correction scheme to attempt to generate a fixed integer solution.

Next, in step 604, the system determines whether fixed integer correction is successful. When the system determines that a fixed integer solution is successfully generated, the system proceeds to step 606 and identifies the fixed integer solution as the carrier phase solution. The system then identifies the more accurate one of the fixed integer solution and the code-based solution as the final result.

Still referring to FIG. 6, if the system determines in step 604 that fixed integer correction has failed, the system proceeds to step 608 and executes a floating point correction scheme to attempt to generate a floating point solution.

Next, in step 610, the system determines whether floating point correction is successful. When the system determines that a floating point solution is successfully generated, the system proceeds to step 612 and identifies the floating point solution as the carrier phase solution. The system then identifies the more accurate one of the floating point solution and the code-based solution as the final result. However, when the system determines in step 610 that floating point correction has also failed, the system proceeds to step 614 and identifies that a carrier phase solution is unachievable for the given set of raw data. Under such circumstances, the system identifies the code-based solution as the final result. Thus, the present invention automatically executes all applicable correction schemes for the given raw data and presents a user with the most accurate final solution possible without requiring excessive user involvement.

It is appreciated that in order to successfully generate a carrier phase solution using a carrier phase correction scheme, certain conditions must be met during the field data collection session. In particular, to obtain a fixed integer solution, 45 minutes continuous tracking of carrier phase data segment for two or more GPS satellites is required. Alternatively, to obtain a floating point solution, 10 minutes continuous tracking of carrier phase data segment for two or more GPS satellites is required. In addition, a base line length of 75 kilometers (km) or less is required for both fixed integer correction and floating point correction. In other words, if none of these conditions is met, there will be insufficient information in the raw data to perform carrier phase correction and a code-based solution will be the best achievable result for the given set of raw data.

Thus, the present invention provides reduced complexity in GPS field data post-processing with a single software package which automates the entire post-processing task without requiring extensive user involvement. In particular, a user of the present invention does not have to manually execute a series of post-processing schemes, deal with multiple user interfaces, or interpret a series of processing results. Instead, a user interacts with a single user interface to initiate the post-processing and all appropriate post-processing schemes are executed automatically. A final result with the best possible accuracy is presented to the user at the end. Consequently, post-processing time is minimized and the usability of GPS post-processing equipment is greatly enhanced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a global positioning system (GPS), a method for differential correction processing of a set of GPS field data, said method comprising the computer implemented steps of:
    a) retrieving said set of GPS field data from a field data storage device;
    b) automatically identifying a most appropriate one of a plurality of correction schemes for said set of GPS field data; and
    c) generating a differential GPS solution for said set of GPS field data with said most appropriate correction scheme.

2. The method as recited in claim 1 wherein said step b) further comprises the computer implemented steps of:
    b1) executing a first correction scheme to generate a first solution;
    b2) determining whether a second correction scheme is applicable to said set of GPS field data;
    b3) provided that said second correction scheme is applicable, analyzing said set of GPS field data to generate a second solution according to said second correction scheme; and
    b4) selectively identifying a more accurate one of said first solution and said second solution as said differential GPS solution.

3. The method as recited in claim 2 further comprising the computer implemented step of:
    b5) provided that said second correction scheme is inapplicable, identifying said first solution as said differential GPS solution.

4. The method as recited in claim 2 wherein said step b4) further comprises the computer implemented steps of:
    analyzing said set of GPS field data to generate a first accuracy indicator pertaining to said first solution;
    analyzing said set of GPS field data to generate a second accuracy indicator pertaining to said second solution; and
    comparing said first accuracy indicator and said second accuracy indicator.

5. The method as recited in claim 2 wherein said step b3) further comprises the computer implemented steps of:
    executing a third correction scheme;
    determining whether said third correction scheme is successful in generating a third solution; and
    provided that said third correction scheme is successful in generating said third solution, identifying said third solution as said second solution.

6. The method as recited in claim 5 wherein said step b3) further comprises the computer implemented steps of:
    provided that said third correction scheme is unsuccessful in generating said third solution, executing a fourth correction scheme;
    determining whether said fourth correction scheme is successful in generating a fourth solution;
    provided that said fourth correction scheme is successful in generating said fourth solution, identifying said fourth solution as said second solution; and
    provided that said fourth correction scheme is unsuccessful in generating said fourth solution, indicating that said second solution is unachievable.

7. The method as recited in claim 2 wherein said first correction scheme is a code-based correction scheme.

8. The method as recited in claim 2 wherein said second correction scheme is a carrier phase correction scheme.

9. The method as recited in claim 5 wherein said third correction scheme is a fixed integer correction scheme.

10. The method as recited in claim 6 wherein said fourth correction scheme is a floating point correction scheme.

11. The method as recited in claim 4 wherein said first accuracy indicator and said second accuracy indicator are statistically computed from said set of GPS field data.

12. The method as recited in claim 1 wherein said method is performed without user intervention.

13. A computer system including a processor, an address/data bus coupled to said processor, and a computer readable memory coupled to communicate with said processor, said processor for performing a method for differential correction processing in a global positioning system (GPS), said method comprising the steps of:
    a) retrieving a set of GPS field data from a field data storage device;
    b) automatically identifying a most appropriate one of a plurality of correction schemes for said set of GPS field data; and
    c) generating a differential GPS solution for said set of GPS field data with said most appropriate correction scheme.

14. The computer system as recited in claim 13 wherein said step b) further comprises the steps of:
- b1) executing a first correction scheme to generate a first solution;
- b2) determining whether a second correction scheme is applicable to said set of GPS field data;
- b3) provided that said second correction scheme is applicable, analyzing said set of GPS field data to generate a second solution according to said second correction scheme; and
- b4) selectively identifying a more accurate one of said first solution and said second solution as said differential GPS solution.

15. The computer system as recited in claim 14 further comprising the step of:
- b5) provided that said second correction scheme is inapplicable, identifying said first solution as said differential GPS solution.

16. The computer system as recited in claim 14 wherein said step b4) further comprises the steps of:
- analyzing said set of GPS field data to generate a first accuracy indicator pertaining to said first solution;
- analyzing said set of GPS field data to generate a second accuracy indicator pertaining to said second solution; and
- comparing said first accuracy indicator and said second accuracy indicator.

17. The computer system as recited in claim 14 wherein said step b3) further comprises the steps of:
- executing a third correction scheme;
- determining whether said third correction scheme is successful in generating a third solution; and
- provided that said third correction scheme is successful in generating said third solution, identifying said third solution as said second solution.

18. The computer system as recited in claim 17 wherein said step b3) further comprises the steps of:
- provided that said third correction scheme is unsuccessful in generating said third solution, executing a fourth correction scheme;
- determining whether said fourth correction scheme is successful in generating a fourth solution;
- provided that said fourth correction scheme is successful in generating said fourth solution, identifying said fourth solution as said second solution; and
- provided that said fourth correction scheme is unsuccessful in generating said fourth solution, indicating that said second solution is unachievable.

19. The computer system as recited in claim 14 wherein said first correction scheme is a code-based correction scheme.

20. The computer system as recited in claim 14 wherein said second correction scheme is a carrier phase correction scheme.

21. The computer system as recited in claim 17 wherein said third correction scheme is a fixed integer correction scheme.

22. The computer system as recited in claim 18 wherein said fourth correction scheme is a floating point correction scheme.

23. The computer system as recited in claim 16 wherein said first accuracy indicator and said second accuracy indicator are statistically computed from said set of GPS field data.

24. The computer system as recited in claim 13 wherein said method is performed without user intervention.

25. In a global positioning system (GPS), a computer-usable medium having computer-readable program code embodied therein for causing a computer to perform the steps of:
- a) retrieving a set of GPS field data from a field data storage device;
- b) automatically identifying a most appropriate one of a plurality of correction schemes for said set of GPS field data; and
- c) generating a differential GPS solution for said set of GPS field data with said most appropriate correction scheme.

26. The computer-usable medium as recited in claim 25 wherein said step b) further comprises the steps of:
- b1) executing a first correction scheme to generate a first solution;
- b2) determining whether a second correction scheme is applicable to said set of GPS field data;
- b3) provided that said second correction scheme is applicable, analyzing said set of GPS field data to generate a second solution according to said second correction scheme; and
- b4) selectively identifying a more accurate one of said first solution and said second solution as said differential GPS solution.

27. The computer-usable medium as recited in claim 26 further comprising the step of:
- b5) provided that said second correction scheme is inapplicable, identifying said first solution as said differential GPS solution.

28. The computer-usable medium as recited in claim 26 wherein said step b4) further comprises the steps of:
- analyzing said set of GPS field data to generate a first accuracy indicator pertaining to said first solution;
- analyzing said set of GPS field data to generate a second accuracy indicator pertaining to said second solution; and
- comparing said first accuracy indicator and said second accuracy indicator.

29. The computer-usable medium as recited in claim 26 wherein said step b3) further comprises the steps of:
- executing a third correction scheme;
- determining whether said third correction scheme is successful in generating a third solution; and
- provided that said third correction scheme is successful in generating said third solution, identifying said third solution as said second solution.

30. The computer-usable medium as recited in claim 29 wherein said step b3) further comprises the steps of:
- provided that said third correction scheme is unsuccessful in generating said third solution, executing a fourth correction scheme;
- determining whether said fourth correction scheme is successful in generating a fourth solution;
- provided that said fourth correction scheme is successful in generating said fourth solution, identifying said fourth solution as said second solution; and
- provided that said fourth correction scheme is unsuccessful in generating said fourth solution, indicating that said second solution is unachievable.

31. The computer system as recited in claim 26 wherein said first correction scheme is a code-based correction scheme.

32. The computer system as recited in claim 26 wherein said second correction scheme is a carrier phase correction scheme.

33. The computer system as recited in claim 29 wherein said third correction scheme is a fixed integer correction scheme.

34. The computer system as recited in claim 30 wherein said fourth correction scheme is a floating point correction scheme.

35. The computer system as recited in claim 28 wherein said first accuracy indicator and said second accuracy indicator are statistically computed from said set of GPS field data.

36. The computer system as recited in claim 25 wherein said steps are performed without user intervention.

* * * * *